United States Patent
Yasaka

(10) Patent No.: US 6,861,478 B2
(45) Date of Patent: Mar. 1, 2005

(54) SEALING RESIN COMPOSITION SEALING FILMS AND USE THEREOF

(75) Inventor: Naoto Yasaka, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 15 days.

(21) Appl. No.: 10/110,754

(22) PCT Filed: Aug. 20, 2001

(86) PCT No.: PCT/JP01/07116

§ 371 (c)(1),
(2), (4) Date: Apr. 17, 2002

(87) PCT Pub. No.: WO02/16525

PCT Pub. Date: Feb. 28, 2002

(65) Prior Publication Data

US 2003/0055191 A1 Mar. 20, 2003

(30) Foreign Application Priority Data

Aug. 22, 2000 (JP) .......................... 2000/251246

(51) Int. Cl.$^7$ .............................................. C08L 23/04
(52) U.S. Cl. ........................................ 525/240; 525/191
(58) Field of Search ................................. 525/240, 191

(56) References Cited

U.S. PATENT DOCUMENTS

| | | | |
|---|---|---|---|
| 3,634,551 A | | 1/1972 | Stancell et al. |
| 4,189,519 A | | 2/1980 | Ticknor |
| 4,666,778 A | | 5/1987 | Hwo |
| 5,277,988 A | * | 1/1994 | Sugi et al. .................. 428/516 |

FOREIGN PATENT DOCUMENTS

| | | | |
|---|---|---|---|
| EP | 0 339 989 A2 | | 11/1989 |
| EP | 0 339 989 | * | 11/1989 |
| JP | 62-246945 A | | 10/1987 |
| JP | 62-246945 | * | 10/1987 |
| JP | 63-114646 A | | 5/1988 |
| JP | 63-114646 | * | 5/1988 |
| JP | 01-315443 A | | 12/1989 |
| JP | 06-228381 A | | 8/1994 |
| JP | 06-328639 A2 | | 11/1994 |
| JP | 10-337829 | * | 12/1998 |
| JP | 10-337829 A | | 12/1998 |
| JP | 2000 079935 A | | 3/2000 |
| JP | 2000-128229 A | | 5/2000 |
| JP | 2000-168003 A | | 6/2000 |
| WO | WO 95/16743 A1 | | 6/1995 |
| WO | WO 99/33913 A | | 7/1999 |
| WO | WO 99/33913 | * | 7/1999 |

OTHER PUBLICATIONS

Charles C. Hwo et al., Research Disclosure Magazine, "Peelable Heat Seal Blends," No. 384, p. 257 (Apr. 1996).

* cited by examiner

Primary Examiner—Ling-Siu Choi
(74) Attorney, Agent, or Firm—Birch, Stewart, Kolasch & Birch, LLP

(57) ABSTRACT

A sealant resin composition comprises 60 to 95 weight percent of ethylene polymer (PE) and 5 to 40 weight percent of 1-butene polymer (PB), wherein a melt flow rate (MFR) ratio between the two polymers ($MFR_{PE}/MFR_{PB}$) is not less than 1. A laminated film obtained by extrusion laminating the resin composition as a sealant film layer over a substrate film adheres tightly to other plastic film by heat sealing and gives a low degree of dependence of heat seal strength on temperature in the heat sealing stage. At the same time the laminated film has an easy peel feature, such that it is readily separated from sealed surfaces after heat sealing, and does not develop any phenomenon of resin threading from the sealed surfaces when they are peeled apart. Accordingly the resin composition is suitably used for the food packaging material.

18 Claims, No Drawings

SEALING RESIN COMPOSITION SEALING FILMS AND USE THEREOF

This application is the national phase under 35 U.S.C. § 371 of PCT International Application No. PCT/JP01/07116 which has an International filing date of Aug. 20, 2001, which designated the United States of America.

TECHNICAL FIELD OF THE INVENTION

The present invention relates to a sealant resin composition, a sealant film having both heat sealability and an easy peel feature, and laminated films and containers for which the sealant film is utilized.

BACKGROUND OF THE INVENTION

A sealant film possessing an easy peel feature used for packaging materials in the manufacture of containers is required to satisfy both a hermetic seal and the easy peel feature. However, these two properties conflict with each other. Out of these two features, the hermetic seal is required to constantly yield a heat seal strength at least sufficient to protect the contents and further show a low degree of dependence of a heat seal strength on temperature so as to be compatible with a wide variety of substrates. On the other hand, with regard to the easy peel feature, the properties required from a viewpoint of preserving a good appearance and preventing contamination of the contents include not only the ability to leave no peel marks (threaded resinous residue) when the sealed surfaces are peeled apart, but also total inhibition of a phenomenon of resin threading while a heat sealing operation is required to be executed to the extent that the sealed surfaces can be readily separated by hand. Moreover, odor transfer from the film to foodstuff is preferably avoided wherever possible in the case of the food packaging sealant film that is offered to the food packaging uses.

So far many types of materials have been developed as a resin for the sealant film. For instance, U.S. Pat. No. 4,189,519 discloses an easy peel sealant material comprising ethylene-vinyl acetate copolymer (EVA) and poly-1-butene. Additionally, U.S. Pat. No. 4,666,778 discloses an easy peel sealant material comprising an ethylenic resin, poly-1-butene, and polypropylene. Nevertheless, according to studies conducted by the inventor of the present invention, the former is apt to be accompanied by transfer of acetic acid odor to the contents and the latter does not readily facilitate adjustment of the seal strength to an adequate degree.

Japanese Laid-open Patent Application No. 315,443/1989 discloses a composition for the easy peel sealant use comprising a poly-1-butene having an average molecular weight of not less than 500,000 and low-density polyethylene. The composition is, however, usable only with limited types of processing techniques due to the high molecular weight of its poly-1-butene content and its low melt flow rate, besides having narrow tolerances in terms of controllability of the seal strength. Although the "Research Disclosure" magazine (issue No. 38433) refers to an easy peel laminated body comprising poly-1-butene and polyethylene polymerized with the metallocene catalyst, this literature fails to give any description regarding the phenomenon of resin threading. Furthermore, Japanese Laid-open Patent Application No. 337,829/1998 describes that a composite film constructed of a seal layer comprised of low-density polyethylene and poly-1-butene and a substrate layer produced from polyethylene resin gives good hermetic seal and openability.

SUMMARY OF THE INVENTION

Accordingly, it is an object of the present invention to provide a sealant resin composition which maintains an adequate balance between heat sealability and an easy peel feature, and is featured by a low degree of dependence of heat seal strength on temperature in a heat sealing stage, and also is hardly susceptible to a phenomenon of resin threading from sealed surfaces when they are peeled apart.

It is another object of the invention to provide a sealant film formed from the composition and laminated films and containers for which such sealant film is utilized.

Namely, the present invention relates to a sealant resin composition comprising compositional units derived from ethylene and compositional units derived from 1-butene, wherein the composition has a melt flow rate of 0.2 to 30 g/10 min., and a film formed from the composition has a heat seal strength of 1 to 10 N/15 mm. when the film is heat sealed at 150° C. and does not substantially produce any thread-like resinous residue when the heat sealed surfaces are peeled apart.

The sealant resin composition is preferably a resin composition comprising an ethylene polymer having a melting point in a region of 100 to 125° C. as measured by a differential scanning calorimeter (DSC) and a 1-butene polymer having a melting point in a region of 70 to 130° C. as measured by the same method. The resin composition has preferably two or more melting peaks in a region of 70 to 130° C. as observed in the DSC test and more preferably has a melting peak having a largest peak area among them in a region of 100 to 125° C. Further the resin composition has preferably a microstructure constituting an islands-in-the-sea structure.

Furthermore, the invention relates to a sealant resin composition comprising 60 to 95 weight percent of an ethylene polymer having a melt flow rate of 0.2 to 30 g/10 min. and a density of 0.900 to 0.940 g/cm$^3$ and 5 to 40 weight percent of a 1-butene polymer having a melt flow rate of 0.1 to 25 g/10 min. and a 1-butene unit content of 60 to 100 mol. percent, wherein a ratio of the melt flow rate ($MFR_{PE}$) of ethylene polymer to the melt flow rate ($MFR_{PB}$) of the 1-butene polymer, i.e., $MFR_{PE}/MFR_{PB}$, is not less than 1. The preferred density of the 1-butene polymer is within a range of 0.880 to 0.925 g/cm$^3$.

The ethylene polymer may be either ethylene homopolymer or ethylene-α-olefin copolymer, although high-pressure process low-density polyethylene, linear ethylene-α-olefin copolymer and a composition thereof are particularly preferred. And, the 1-butene polymer may be either 1-butene homopolymer or 1-butene-α-olefin copolymer. This resin composition is suited to the film forming and is capable of providing films possessing both the easy peel feature and the heat sealability.

The present invention, furthermore, relates to a sealant film formed from the sealant resin composition having a thickness of 3 to 100 μm and easy peel feature, which can be manufactured in the extrusion lamination process, cast molding or tubular film process. It is an unique feature of this film that even when the sealed surfaces produced by lap jointing its surfaces together or lap jointing its surface to a film of another kind are peeled apart, there is not substantially observed any phenomenon of resin threading from the peeled surfaces.

The invention, moreover, relates to a laminated film comprising a layer of the sealant film and at least a layer of a film selected from the group consisting of polyolefin film, polystyrene film, polyester film, polyamide film, a laminated film constructed of polyolefin film and gas barrier resin film, aluminum foil and deposited film, which is suitable for a packaging film having both the heat sealability and the easy peel feature.

There can be cited as an embodiment an integrated laminated film obtained by laminating in the following order a layer of the sealant film, a layer of polyolefin film and at least a layer of a film selected from the group consisting of polystyrene film, polyester film, polyamide film, laminated film comprised of a polyolefin film and gas barrier resin film, aluminum foil and deposited film.

The invention, furthermore, relates to containers capable of hermetically sealed packaging a content by way of making two opposite surfaces of the sealant film layer of the laminated film to be lap jointed to each other by heat sealing or by way of lap jointing the sealant film layer of the laminated film to a molding produced from a resin of another kind by heat sealing. In cases where the content is foodstuff, odor hardly transfers from this container to the contained foodstuff.

DETAILED DESCRIPTION OF THE INVENTION

The present invention relates to a sealant resin composition comprised of compositional units derived from ethylene and compositional units derived from 1-butene, and a sealant film, laminated films and containers for which the composition is utilized. The invention and its composing elements are explained in detail as follows.

Sealant Resin Composition (1)

The sealant resin composition (1) of the present invention has such chemical structure that at least compositional units derived from ethylene and compositional units derived from 1-butene are contained therein. It is a so-called olefinic resin. Since both of these compositional units exist therein, this resin composition possesses both heat sealability and the easy peel feature.

The compositional units each can be detected by infrared absorption spectrum analysis. That is to say, compression molded film specimens of this resin composition are subjected to infrared absorption spectrum analysis, whereby identification of the two compositional units can be executed in light of a finding that the absorption of the compositional unit derived from ethylene occurs in a region of 700 to 740 $cm^{-1}$ and the absorption of the compositional unit derived from 1-butene occurs in a region of 750 to 780 $cm^{-1}$.

More specifically, it is desirable that this resin composition comprises at least an ethylene polymer having a melting point in a region of 100 to 125° C. as measured by a differential scanning calorimeter (DSC) and a 1-butene polymer having a melting point in a region of 70 to 130 CC as measured by the same method. The DSC test is tollowed through by heating the specimen of this resin composition from room temperature to 200° C. to completely melt it and maintaining the temperature for 10 min. and after the lapse of this dwell time it is cooled to 0° C. at a cooling rate of 10° C. /min. Once again, heating is resumed and heating is carried out at a heating rate of 10° C./min., and observation is made throughout this cycle to record resultant endothermic peaks. The positions of endothermic peak thus emerged are recorded as the melting points of the sample polymers.

It is preferable that the resin composition has two or more melting peaks on the DSC thermal curve in a region of 70 to 130° C., and the melting peak having a largest peak area exists in a region of 100 to 125° C. When the melting peak having the largest peak area exists in the region, a sealant film formed from the resin composition possesses good low temperature heat sealability and does not substantially produce any phenomenon of resin threading when the sealed surfaces are peeled apart.

In the measurement of melting points by the DSC, in cases where melting peaks attributed to the components of the resin composition are observed in a separated state, a peak found to have a larger peak area by overall comparison may be treated as the melting peak having a largest peak area. On the other hand, in cases where an endothermic peak is not separated but forms a shoulder of another peak, the peak that does not assume the shape of the shoulder is to be treated as the melting peak having a largest peak area. In other cases where endothermic peaks are not completely separated, but are observed to assume a double-peak shape, the product of the peak height and the width at half-height of the endothermic peak is calculated for each peak and the peak having a largest value is treated as the melting peak having a largest peak area.

It is desirable that this resin composition is constituted with a microstructure wherein resins derived from at least two species of compositional units form so-called an "islands-in-the-sea structure ". More preferably, the ethylene polymer and the 1-butene polymer may mutually have the appearances of the islands-in-the-sea structure. Furthermore preferably, the islands-in-the-sea structure assumes the form of the body of water built by the ethylene polymer wherein the 1-butene polymer is dispersed all over as if islands in it. It is inferred that the islands-in-the-sea structure of the resin composition contributes to the generation of an adequate balance between the heat sealability and the easy peel feature.

The microstructure of the resin composition can be verified by a transmission electron microscope (TEM) examination which is performed by preparing in the first place thin slices from a sample of the resin composition available in the pellet or film form using a microtome, etc., and then, after dyeing those slices with osmium, examining the specimen under the TEM of 10,000 magnifications.

On the other hand, it is desirable that this resin composition has a melt flow rate of 0.2 to 30 g/10 min. as measured in accordance with ASTM D-1238 under conditions of 190° C. and a load of 2.16 kg, preferably 1 to 25 g/10 min., more preferably 2 to 25 g/10 min., and furthermore preferably in excess of 2 g/10 min., but not more than 25 g/10 min. So long as the melt flow rate remains within these ranges, the resin composition yields good film moldability and eventually a sufficient mechanical strength is secured when converted into a film layer The heat seal strength of film formed from this resin composition when it is heat sealed at 150° C. is 1 to 10 N/15 mm, and preferably 1 to 8 N/15 mm. So long as the heat seal strength remains within the ranges, the heat sealed film gives a practically sufficient adhesive strength as well as good peelability, and thus serves as a favorably workable packaging material.

It is an important aspect of the present invention that there is not substantially produced any fluffing, so-called threading, from the surface of sealant film layer, when this film is peeled apart from the sealed surface after heat sealing it to an adherend, and hence concerns about contamination of the packed content may be thus eliminated. The phenomenon of threading is observed by visual examination.

The sealant resin composition (1) of the present invention is, for example, manufactured by blending the ethylene polymer with the 1-butene polymer as described latter.

Sealant Resin Composition (2)

The resin composition (2) of the present invention comprises at least the below-mentioned ethylene polymer and 1-butene polymer. That is to say, it is a resin composition comprising 60 to 95 weight percent of an ethylene polymer having a melt flow rate of 0.2 to 30 g/10 min. and a density of 0.900 to 0.940 g/cm$^3$ and 5 to 40 weight percent of a 1-butene polymer having a melt flow rate of 0.1 to 25 g/10 min. and a 1-butene unit content of 60 to 100 mol. percent, wherein the ratio of the melt flow rate (MFR$_{PE}$) of the ethylene polymer to the melt flow rate (MFR$_{PB}$) of the 1-butene polymer, i.e., MFR$_{PE}$/MFR$_{PB}$, is not less than 1.

Ethylene polymer:

The ethylene polymer usable for the present invention may be either ethylene homopolymer or ethylene-α-olefin copolymer. Its molecular structure may be either of the linear type or of the branched type, the latter of which having long or short side chains.

In the case of copolymer, α-olefin as a comonomer is an α-olefin having preferably 3 to 20 carbon atoms, and more preferably 3 to 10 carbon atoms, and is random copolymerized with ethylene. There can be cited as specific examples of such α-olefin the following: Propylene, 1-butene, 1-pentene, 1-hexene, 1-heptene, 1 -octene, 1-decene, 1-undecene, 3-methly-1-butene, 3-methyl-1-pentene, 4-methyl-1-pentene, 4-methyl-1-hexene, 4,4-dimethyl-1-hexene and any combination thereof. Insofar as required, it may contain a small amount of other comonomer(s). It is desirable that the ethylene content of the copolymer is 85 to 99.9 mol. percent, and preferably 90 to 99.5 mol. percent. The desirable α-olefin content is 0.1 to 15 mol. percent and preferably 0.5 to 10 mol. percent.

The density of the ethylene polymer is 0.900 to 0.940 g/cm$^3$, and preferably 0.905 to 0.930 g/cm$^3$. Such ethylene polymer falls under the category of low-density polyethylene or medium-density polyethylene. The ethylene polymer falling in this density range possesses a low-temperature heat sealability, and an obtained container can be filled with a content at a high filling speed, when the container is finally fabricated from the film, since the surface of the inner layer film (the sealant layer) possesses a low tackiness. Thereupon, the density of the ethylene polymer is measured using a density gradient tube by way of subjecting the strand obtained in the below-mentioned melt flow rate measurement to a 1 hr-long heat treatment at a temperature of 120° C. and then allowing it to cool down to room temperature after 1 hr.

The melt flow rate (MFR) which is measured in accordance with ASTM D-1238 under the conditions of 190° C. and a load of 2.16 kg is 0.2 to 30 g/10 min., preferably 1.0 to 25 g/10 min., and more preferably 2.0 to 25 g/10 min. So long as the melt flow rate remains within these ranges, the ethylene polymer may be formed into a film at a high molding speed using a conventional molding machine. It is desirable that the melting point measured by the DSC test stands in a region of 100 to 125° C.

The ethylene polymer whose properties such as density, melt flow rate, and melting point are within the ranges may be manufactured through homopolymerization of ethylene or copolymerization of ethylene with α-olefin using a radical polymerization catalyst, Phillips catalyst, Ziegler-Natta catalyst or metallocene catalyst.

In particular, the preferred type is so-called high-pressure process low-density polyethylene produced in a tubular-type reactor or an autoclave-type reactor using a radical polymerization catalyst. Above all, the polymer whose melt flow rate (MFR) as related to melt tension (MT) (as measured at 190° C.; unit: mN) satisfies the following equation is preferred from the viewpoint of controlling conditions of the film forming:

$$40\times(MFR)^{-0.67} \leq MT \leq 250\times(MFR)^{-0.67}$$

Linear ethylene-α-olefin copolymer manufactured with Ziegler-Natta catalyst or metallocene catalyst also may be favorably employed. Since long chain or short chain branches may be generated by adjusting the polymerization conditions, ethylene-α-olefin copolymer thus produced also may be used.

Furthermore, this ethylene polymer may be used in the form of a composition prepared as a blend with ethylene polymer of several different kinds. For instance, when a composition of high-pressure process low-density polyethylene and linear ethylene-α-olefin copolymer is prepared in conformance with a [(High-pressure process low-density polyethylene) to (Linear ethylene-α-olefin copolymer)] mixing ratio which is within a range of 0/100 to 75/25 (parts by weight), and preferably 5/95 to 75/25 (parts by weight), the balance between the seal strength and the peel strength may be readily adjusted.

That is to say, in light of the decline in the seal strength which tends to result from an increased mixing ratio of the high-pressure process low-density polyethylene, the balance between the seal strength and the peel strength may be adjusted to a desired degree by way of increasing the relative content of high-pressure process low-density polyethylene for such application areas that particularly require the easy peel feature, and, conversely, by way of increasing the relative content of linear ethylene-α-olefin copolymer for such application areas where a high seal strength is necessitated.

1-Butene Polymer:

1-Butene polymer usable for the present invention is 1-butene homopolymer or a copolymer of 1-butene with α-olefin of any kind having 2 to 20 carbon atoms, and preferably 2 to 10 carbon atoms except 1-butene. As specific examples of such α-olefin, there can be cited the same α-olefins as described before. Above all, ethylene, propylene, 1-hexene, 4-methyl-1-pentene, and 1-octene are preferred. A small amount of other type of comonomer(s) may be contained therein insofar as required. It is desirable that a 1-butene content of the copolymer is 60 to 100 mol. percent, and preferably 70 to 100 mol. percent, and an α-olefin content is 0 to 40 mol. percent and preferably 0 to 30 mol. percent.

The density of the 1-butene polymer is preferably 0.880 to 0.925 g/cm$^3$, and more preferably 0.885 to 0.920 g/cm$^3$. Since the surface of the film obtained from the resin composition possesses a low tackiness when the density of the 1-butene polymer falls in this range, a container obtained from the film may be filled with the content at a high filling speed in the final packaging stage.

The melt flow rate (MFR) which is determined in accordance with ASTM D-1238 under conditions of 190° C. and a load of 2.16 kg is 0.1 to 25 g/10 min., preferably 1.0 to 25 g/10 min., more preferably 2 to 25 g/10 min., furthermore preferably in excess of 2 g/10 min., but not more than 25 g/10 min., and most preferably 2.5 to 25 g/10 min.

So long as the melt flow rate of 1-butene polymer remains within the ranges, the resin composition does not exert an excess load onto the motor in the molding machine, and hence the film may be formed under a low resin pressure. Even if the condition of increased film forming speed is adopted, the emission of odor (fume) in consequence of oxidative degradation of the resin composition or the blocking of film may be restrained, since the heat developed by shear stress is held to a low degree. When the melt flow rate of 1-butene polymer is decreased, surging (the phenomenon wherein the extrudate becomes inconsistent) tends to take place in the film forming stage with the result that the thickness of film becomes inconsistent and/or the draw-down characteristics is deteriorated. However, such a situation may scarcely occur when the melt flow rate of 1-butene polymer is within said ranges. Furthermore, it becomes easy to adjust the heat seal strength and lower the degree of dependence of the heat seal strength on heat seal temperature.

It is desirable that the melting point as measured by the DSC falls within a region of 70 to 130° C.

Such 1-butene polymer can be manufactured through a polymerization process with a stereoregular polymerization catalyst disclosed in Japanese Patent Publication No. 7088/1989, and Japanese Laid-open Patent Application Nos. 206415/1984, 206416/1984, 218507/1992, 218508/1992, 225605/1996, etc., respectively. For the purpose of the present invention, either type of the 1-butene polymers described before may be employed or any combination of two or more types may be employed.

Resin composition:

The resin composition (2) of the present invention comprises at least the ethylene polymer and the 1-butene polymer described before, and the desirable mixing ratios are 60 to 95 weight percent, and preferably 65 to 85 weight percent for the ethylene polymer and 5 to 40 weight percent, and preferably 15 to 35 weight percent for the 1-butene polymer, wherein the sum of the two polymers is 100 weight percent. Insofar as the two polymers remain within the ranges, the film formed from the composition gives an adequate balance between the heat sealability and the easy peel feature, and hence easy openability may be provided in favor of the users, while a practical heat seal strength required for the packaging material may be secured at the same time. Consequently, this resin composition is suitably usable for manufacturing a sealant film having the easy peel feature.

Furthermore, it is desirable that the ratio of the melt flow rate of the ethylene polymer ($MFR_{PE}$) to that of the 1-butene polymer ($MFR_{PB}$) constituting this resin composition, i.e., ($MFR_{PE}/MFR_{PB}$), is not less than 1. More specifically, the ($MFR_{PE}/MFR_{PB}$) ratio is represented by the following equations.

That is to say, $1 \leq MFR_{PE}/MFR_{PB}$, preferably $1 \leq MFR_{PE}/MFR_{PB} \leq 20$, and more preferably $1 \leq MFR_{PE}/MFR_{PB} \leq 10$.

So long as the melt flow ratio between the two polymers satisfies the above relationship, such otherwise resultant phenomenon of resin threading from the peeled surfaces may be substantially prevented when the heat sealed films are separated at the interface.

That is to say, when the sealant film formed from this resin composition is bonded to an identical film by heat sealing or the sealant film is bonded to a film formed from polyethylene, ethylene-vinyl acetate copolymer, polypropylene, etc. by heat sealing and the sealant film is forcibly peeled apart, there does not substantially occur any phenomenon of resin threading from the peeled surfaces.

It is preferable that this resin composition has such structure that the ethylene polymer constitutes the matrix phase and 1-butene polymer constitutes the dispersant phase contained therein in the state of micro-dispersion, that is to say, both of which creating the aforesaid islands-in-the-sea structure. By virtue of the melt viscosity of the 1-butene polymer controlled to within the aforesaid specific range in relation to the melt viscosity of the ethylene polymer, the dispersed 1-butene polymer assumes the spherical shape. It is inferred that such islands-in-the-sea structure of the resin composition contributes to the prevention of the phenomenon of resin threading from the peeled surfaces when sealed films are peeled apart. Furthermore, it is desirable that the resin composition of the present invention possesses at the same time the properties of the resin composition (1).

Such additives as antioxidant, heat stabilizer, antiweathering stabilizer, slip agent, antiblocking agent may be added to the resin composition insofar as required to the extent not deviating from the object of the present invention. The nucleating agent disclosed in U.S. Pat. Nos. 4,320,209, 4321334, and 4322503, respectively, may be also added.

In the manufacture of the resin composition, specific amounts of ethylene polymer, 1-butene polymer and, insofar as required, various additives may be homogeneously mixed and are, insofar as necessary, kneaded. Mixing may be accomplished utilizing Henschel mixer, Banbury mixer, tumbler mixer, single-screw or twine-screw extruder, etc.

The resin composition explained so far can be used as a resin for producing film by extrusion lamination, cast molding, or tubular film process, since it has good processibility. In particular, it is suitable for extrusion lamination.

Sealant Film

By way of forming film from the resin composition, sealant film can be manufactured as a packaging material requiring the easy peel feature. The process to employ for forming a film may be either cast molding or tubular film process. Film having uniform thickness and good appearance may be produced at a high forming speed usually at a resin temperature of 180 to 240° C. As for the film thickness, 3 to 100 μm is adequate for the sealant layer. A sealant film layer can be also formed by extrusion laminating the resin composition directly onto a substrate film in accordance with a procedure described later.

When a stack of two layers of this sealant film is heat sealed together or this sealant film placed over a film of another kind is heat sealed, the lap jointed two layers and yet the two layers may be separated from each other with an adequate force. Therefore the obtained film may be utilized as a film possessing both the heat sealability and the easy peel feature. Besides, there is hardly produced any thread-like resinous residue on the peeled surfaces when the jointed films are forcibly peeled apart.

There is no particular limitation to the conditions of heat sealing. When heat sealing is executed under conditions of a sealing temperature of 120 to 180° C. and a sealing pressure of 0.1 to 0.5 MPa, practically sufficient adhesive strength may be achieved and inconsistency in the adhesive strength due to variances in the heat sealing temperature is minimized. For example, the adhesive strength remains in a range of 1 to 10 N/15 mm when the heat sealing is executed under conditions of the heat sealing temperature of 150° C., the sealing pressure of 0.2 MPa and the sealing time of 1 sec.

Laminated Film

While this sealant film is, as a matter of course, usable by itself, it is often offered to the packaging film or sheet uses in the form of laminated film in which this sealant film is laminated over a substrate film. The sealant film is also usable as a material for containers or container covering material.

There is no particular limitation to the usable type of substrate film. In light of the intended serviceability as a packaging material, appropriate types are selected from among the following films. Namely, polyolefin film produced from polyethylene, polypropylene, etc.; film produced from styrene resin; polyester film produced from polyethylene terephthalate, polybutylene terephthalate, etc.; polyamide film produced from Nylon 6, Nylon 66, etc.; laminated film constructed of polyolefin film and gas barrier resin film produced from such as polyamide resin or ethylene-vinyl alcohol copolymer resin; metal foil produced from aluminum, etc.; film deposited with aluminum, silica, etc. Among those various films, the usable type is not limited to one type, but two or more types may be used in combination.

Since the sealant film layer is to constitute at least one outermost layer in the laminated film, either one of the following processes may be adopted for manufacturing the laminated film. Namely, the extrusion lamination accomplished by laminating the resin composition explained above directly or indirectly onto a substrate film; the dry lamination of the sealant film over a substrate film; and the co-extrusion accomplished by extruding resins to constitute the two layers.

The laminated film is basically constructed of a sealant film and a substrate film. However, in cases where the adhesive strength between the sealant film and the substrate film is insufficient, there may be adopted modified combinations of films. For example, it may well be a lamination constructed of at least triple layers fabricated by stacking a sealant film layer, a film layer of a different type having adhesivity, and a substrate film in said order. The sealant film may be employed in combination with any appropriate films in light of the intended serviceability of the required packaging material.

As an embodiment for the laminated film, there can be cited a film constructed of a sealant film layer, a polyolefin film layer and a film layer of another material. As the film layer of another material, there can be cited a layer selected from the aforementioned group consisting of polystyrene film; polyester film; polyamide film; laminated film constructed of polyolefin film and gas barrier resin film; aluminum foil; and deposited film.

In cases where the polyolefin film layer cannot be bonded to the film layer of another material to have sufficient adhesive strength, the lamination may be constructed of a sealant film layer, a polyolefin film layer, an adhesive layer, and a film layer of another material. When an anchor coating agent such as a urethane-based adhesive or an isocyanate-based adhesive, or modified polyolefin such as unsaturated carboxylic acid-grafted polyolefin is used as the adhesive resin of the adhesive layer, the state of firm bond to the neighboring layers may be achieved.

Containers

Sealed containers, for example, pouch-shape containers, can be manufactured by means of firmly lap jointing two sheets of the laminated film so as to have their sealant film layers face each other, or bending the laminated film to let its sealant film layer assume a face-to-face position, or making the sealant film layer of the laminated film face a film of another kind, and then heat sealing from either outer surface of the stacked films along their edges so that the obtained article may conform the configuration of the intended container. Filled packages can be automatically obtained in case the pouch-shape container fabrication line is integrated with the filling line of content, that is to say, the bottom section and the side sections are heat sealed in the first place, and then after filling the pouch with the content, the top section of the package is heat sealed. Accordingly, this laminated film can be utilized as the feed material compatible with the regular automatic packing machine that is capable of packaging solids such as snack food, etc. and pulverized or liquid materials.

Furthermore, a filled package can be obtained by filling a container molded into the cup-shape by vacuum forming or deep drawing the laminated film (or sheet) or film (or sheet) of another kind, or conventional injection-molded container, and then covering such container with the laminated film or a film of another kind as the covering material, and finally providing a heat seal from the top of the container or around the circumference of its side. In this case, the sealant film of the present invention can be utilized as the sealant layer of the covering material, the sealant layer of the container per se, or both of them. The obtained container is suitably utilized for packaging instant noodle pre-packed in a cup, "miso" bean paste, ham, bacon, jelly, pudding, snack food, etc.

The construction and the manufacturing method of the container is by no means limited by the explanation given above, but may be changed liberally. As for the other type of film or container usable with the sealant film or the laminated film of the present invention, conventional packaging materials formed from such resins as polyethylene, ethylene-vinyl acetate copolymer, and polypropylene may be used. For example, packaging containers can be formed by means of molding a container having a flange at its opening portion from such material and then, after placing a sealant film on the flanged opening, lap jointing the two surfaces, and then heat sealing the stacked layers. Since the sealant film or the sealant film layer may be heat sealed with the packaging material with a sufficient adhesive strength and demonstrates the easy peel feature when the seal is opened, this container can be suitably used as a packaging container that is capable of providing hermetic seal and easy peel feature, in particular in the food packaging area.

EXAMPLES

The present invention is illustrated in reference to the following examples; however, these examples are not to be construed to limit the scope of the present invention.

Firstly, the types of resin used in examples and their properties are shown in Table

TABLE 1

| Resin code | Kind of Resin | Comonomer & Content (mol. %) | Polymerization catalyst | MFR (g/10 min.) | Density (g/cm³) |
|---|---|---|---|---|---|
| PE 1 | Linear low-density polyethylene | MP 3 | T | 2.0 | 0.920 |
| PE 2 | Linear low-density polyethylene | H 3.5 | M | 4.0 | 0.920 |
| PE 3 | Linear low-density polyethylene | B 3 | T | 20 | 0.920 |
| PE 4 | High-pressure process low-density polyethylene | — 0 | R | 4.0 | 0.918 |
| PE 5 | High-pressure process low-density polyethylene | — 0 | R | 10 | 0.918 |
| PB 1 | 1-Butene-ethylene copolymer | E 1 | T | 1.0 | 0.910 |
| PB 2 | 1-Butene polymer | — 0 | T | 2.5 | 0.915 |
| PB 3 | 1-Butene-ethylene copolymer | E 5 | T | 4.0 | 0.910 |
| PB 4 | 1-Butene polymer | — 0 | T | 20 | 0.910 |

LEGEND: Comonomer: "MP" denotes 4-methyl-1-pentene, "H" denotes 1-hexene, "B" denotes 1-butene, and "E" denotes ethylene.
Polymerization catalyst used at resin production: "T" denotes titanium catalyst, "M" denotes metallocene catalyst, and "R" denotes radical polymerization catalyst.

Examples 1–9 and Comparative Examples 1–3

Resin compositions for the sealant layer film were prepared using the resins shown in Table 1 which were mixed at the mixing ratios shown in Table 2. In the next step, double layer films were formed using a linear low-density polyethylene having a density of 0.920 g/cm³ and a melt flow rate of 2.0 g/10 min. as the substrate layer film. The film was constructed of a substrate layer having a thickness of 50 μm and a sealant layer having a thickness of 20 μm.

For forming the double layer film, an extruder having a screw diameter of 40 mm was used to form the substrate layer and an extruder having a screw diameter of 30 mm was used to form the sealant layer, and then a multi-layer casting machine equipped with a 30 cm-wide die was used to obtain a double layer films. For each layer, the applied forming temperature was 220° C., the chill roll temperature 30° C., and the film take-up speed 10 m/min.

Results of the DSC tests to determine the melting peaks of the constituents constituting the resin composition for the sealant layer and the transmission electron microscope (TEM) examination to determine the presence or absence of phase separation (the islands-in-the-sea structure) are shown in Table 2, respectively.

Moreover, for evaluating properties of the obtained double layer film, tests were performed in accordance with the following testing procedures with respect to its optical property, heat seal strength and phenomenon of resin threading from the peeled surfaces. Results of these tests are shown in Table 2.

(1) Optical property: Haze was determined in accordance with ASTM D-100361. Pertinent values are indicated by percentage.

(2) Heat seal strength: Two 15 mm-wide oblong specimens were prepared. After stacking them so that one sealant layer faces the other, heat sealing was executed from the substrate film side at a specified temperature under conditions of a load of 0.2 MPa and a sealing time of 1 sec. Thereupon, the bonded layers were peeled apart at the interface in the direction of 180 deg. at a speed of 300 mm/min. The peel strength was measured and the obtained value was indicated as the heat seal strength (N/15 mm width).

(3) Resin threading phenomenon: After the heat seal strength test, the state of peel on the peeled surfaces was examined by a visual test.

The case in which thread-like resin remained on the peeled surfaces as a resinous residue and an appearance of the peeled surfaces was not so good was reported as "Yes (Inferior)."

On the contrary, the cases in which there was not found any thread-like resinous residue and an appearance of the peeled surfaces was good was reported as "None."

TABLE 2

| | Example 1 | Example 2 | Example 3 | Example 4 | Example 5 | Example 6 | Example 7 | Example 8 | Example 9 | Compar. Example 1 | Compar. Example 2 | Compar. Example 3 |
|---|---|---|---|---|---|---|---|---|---|---|---|---|
| Resin composition (% by wt.) | | | | | | | | | | | | |
| PE 1 | 80 | 70 | — | — | — | — | — | — | — | 100 | 70 | 70 |
| PE 2 | — | — | 70 | 55 | 40 | 25 | — | — | — | — | — | — |
| PE 3 | — | — | — | — | — | — | 70 | 70 | 70 | — | — | — |
| PE 4 | — | — | — | 15 | 30 | 45 | — | — | — | — | — | — |
| PB 1 | 20 | 30 | — | — | — | — | 30 | — | — | — | — | — |
| PB 2 | — | — | 30 | 30 | 30 | 30 | — | 30 | — | — | — | — |
| PB 3 | — | — | — | — | — | — | — | — | 30 | — | 30 | — |
| PB 4 | — | — | — | — | — | — | — | — | — | — | — | 30 |
| $MFR_{PE}/MFR_{PB}$ | 2.0 | 2.0 | 1.6 | 1.6 | 1.6 | 1.6 | 20 | 8 | 5 | — | 0.5 | 0.1 |
| Melting peak by DSC (° C.) | 112 120 | 112 120 | 120 125 | 108 120 125 | 108 120 125 | 108 120 125 | 112 120 | 120 125 | 104 120 | 120 | 104 120 | 123 120 |
| Presence of phase Separation | Yes | Yes | Yes | Yes | Yes | Yes | Yes | Yes | Yes | None | Yes | Yes |
| Haze (%) | 6.2 | 8 | 5.5 | 8.4 | 12.7 | 7.6 | 54 | 38 | 15 | 2.9 | 4.5 | 14.1 |
| Heat seal strength (N/15 mm) Sealing temperature (° C.) | | | | | | | | | | | | |
| 120 | 3.5 | 4.9 | 5.2 | 2.4 | 1.1 | 1.0 | 4.0 | 3.5 | 3.2 | 13.1 | 1.4 | 2.0 |
| 130 | 7.6 | 5.3 | 5.8 | 3.0 | 1.5 | 1.1 | 6.1 | 3.8 | 3.6 | 15.0 | 2.2 | 2.4 |
| 140 | 8.8 | 5.9 | 6.4 | 3.9 | 1.9 | 1.4 | 9.5 | 5.4 | 5.0 | 15.8 | 3.5 | 2.4 |
| 150 | 8.6 | 6.3 | 6.9 | 3.7 | 2.4 | 1.8 | 9.6 | 6.5 | 6.1 | 16.4 | 4.0 | 2.2 |
| 160 | 8.6 | 6.4 | 7.0 | 4.1 | 2.8 | 2.0 | 9.4 | 7.3 | 7.0 | 16.8 | 4.1 | 2.4 |
| Presence of the phenomenon of resin threading from the peeled surfaces | None | None | None | None | None | None | None | None | None | None | Yes (Inferior) | Yes (Inferior) |

As can be seen from Table 2, the heat seal strength was practically sufficient, but remained in a range of permitting hand peeling by way of employing a composition comprised of ethylene polymer and 1-butene polymer as mentioned in the relevant Examples for the sealant layer, and hence a laminated film having a good balance between the two properties could be obtained. Meanwhile, it was learned that there was not observed any phenomenon of resin threading from the peeled surfaces upon separation of the films, and hence it was found to be a suitable packaging material. With the Comparative Examples taken into consideration, it was learned that the $MFR_{PE}/MFR_{PB}$ values were closely related with the occurrence of the phenomenon of resin threading from the peeled surfaces.

Examples 10–12 and Comparative Example 4

A double layer film was formed using a composition prepared by mixing 75 weight percent of PE 2 and 25 weight percent of PB 2 as shown in Table 1 for the sealant film layer and a linear low-density polyethylene having a density of 0.920 g/cm$^3$ and a melt flow rate of 2.0 g/10 min. for the substrate film layer. The film was constructed of a substrate layer having a thickness of 50 μm and a sealant layer having a thickness of 20 μm.

An extruder having a screw diameter of 40 mm was used to form the substrate layer and an extruder having a screw diameter of 30 mm was used to form the sealant layer, and then a multi-layer casting machine equipped with a 30 cm-wide die was employed to obtain the double layer film. For each layer, the applied forming temperature was 220° C., the chill roll temperature 30° C., and the film take-up speed 10 r/min.

By way of stacking over the sealant layer side of the obtained double layer film each adherend film having a thickness of 200 μm as mentioned in Table 3, heat sealing was executed under the same conditions as adopted for the said heat seal strength test, and then the heat seal strength was measured. At the same time, the peeled surfaces were observed so as to evaluate whether the phenomenon of resin threading had taken place from the peeled surfaces. Results of the tests are shown alongside in Table 3.

TABLE 3

| | Example 10 | Example 11 | Example 12 | Compar. Example 4 |
|---|---|---|---|---|
| Kind of adherend* | LDPE | HDPE | PP | PS |
| Heat seal strength (N/15 mm) Sealing temperature | | | | |
| 120 (° C.) | 4.6 | 4.1 | — | Failed in sealing |
| 130 | 5.1 | 4.7 | 5.6 | |
| 140 | 5.4 | 5.4 | 6.3 | |
| 150 | 5.8 | 5.7 | 6.7 | |
| 160 | 5.9 | 6.0 | 7.1 | |
| 170 | 6.1 | 6.2 | 7.3 | |
| Phenomenon of resin threading from the peeled surfaces | None | None | None | — |

LEGEND: *"LDPE" denotes low-density polyethylene, "HDPE" denotes high-density polyethylene, "PP" denotes propylene homopolymer, and "PS" denotes polystyrene.

Examples 13–15 and Comparative Example 5

A double layer film was formed in accordance with the procedures employed for Example 10 except that the resin composition used to form the sealant layer was changed to a composition comprised of 60 weight percent of PE 1, 15 weight percent of PE 4 and 25 weight percent of PB 1 as shown in Table 1.

By way of stacking over the sealant layer side of the obtained double layer film each adherend film having a thickness of 200 μm as mentioned in Table 4, heat sealing was executed under the same conditions as adopted for the said heat seal strength test, and then the heat seal strength was measured. At the same time, the peeled surfaces were observed so as to evaluate whether the phenomenon of resin threading had taken place from the peeled surfaces. Results of the tests are shown alongside in Table 4.

TABLE 4

| | Example 13 | Example 14 | Example 15 | Compar. Example 5 |
|---|---|---|---|---|
| Heat seal strength (N/15 mm) Sealing temperature | LDPE | HDPE | PP | PS |
| 120 (° C.) | 4.4 | 3.8 | — | Failed in sealing |
| 130 | 4.6 | 4.3 | 6.2 | |
| 140 | 5.0 | 5.3 | 6.7 | |
| 150 | 4.8 | 5.3 | 6.6 | |
| 160 | 4.9 | 5.3 | 7.0 | |
| 170 | — | — | 6.8 | |
| Phenomenon of resin threading from the peeled surfaces | None | None | None | — |

As the results set forth in Tables 3 and 4 clearly show, in case the adherend is polyethylene film or polypropylene film, good adhesive was achieved with the sealant film layer, and its heat seal strength was within a feasible range with regard to the easy peel feature. Besides, there was not observed any resin threading phenomenon, and hence such sealant film was found suited to the packaging application, although it did not adhere to polystyrene film.

Example 16

A double layer film was prepared by lap jointing a polyester (polyethylene terephalate) film having a thickness of 12 μm to a low-density polyethylene film having a thickness of 25 μm using an anchor coating agent, and then by laminating a sealant film layer over the surface of the low-density polyethylene film in the double layer film employing the extrusion lamination technique, and thus was obtained a triple film layer wherein the thickness of the sealant film layer was 20 μm.

As the resin to constitute the sealant film layer, a resin composition comprised of 80 weight percent of PE 5 and 20 weight percent of PB 3 mentioned in the Table 1 was used.

Extrusion lamination was executed using a lamination machine having a screw diameter of 65 mm and equipped with a 500 mm-wide die. The operating temperatures for the respective zones in the extruder were set as follows:

C1/C2/C3/C4/D=200° C./270° C./305° C./305° C./305° C.

The extrusion speed was 80 m/min.

Conditions in which the extrusion lamination was executed were evaluated and the obtained triple layer film was examined with respect to its properties. Results of the examination are set forth in Table 5. A neck-in characteristics, a draw-down characteristics and the heat seal strength were determined in accordance with the following procedures.

(1) Neck-in characteristics: After a sealant film was formed under conditions of a film thickness of 20 μm and film take-up speed of 80 r/min., neck-in values along the both edges were measured.

(2) Draw-down characteristics: The film take-up speed of the sealant film was increased from that set for the time of the neck-in characteristics test and the take-up speed at which the film was broken was recorded as draw-down values.

(3) Heat seal strength: High-pressure process low-density polyethylene film having a thickness of 200 μm was stacked as the adherend over the sealant layer side of the obtained triple layer film and heat sealing was executed under the same conditions as applied in the heat seal strength test. Thereupon, its heat seal strength was measured. At the same time, the peeled surfaces were observed so as to evaluate whether or not the phenomenon of resin threading had developed.

Comparative Example 6

A triple layer film was obtained in accordance with the procedures employed for Example 16 except that the resin composition comprised 80 weight percent of PE 5 and 20 weight percent of PB 4 for the resin to form the sealant layer film. Conditions in which the extrusion lamination was executed were evaluated and the obtained triple layer film was evaluated with respect to its properties. Results of the evaluation are set forth in Table 5.

TABLE 5

|  | Example 16 | Compar. Example 6 |
|---|---|---|
| Resin composition of the sealant layer (% by weight) |  |  |
| PE 5 | 80 | 80 |
| PB 3 | 20 | — |
| PB 4 | — | 20 |
| $MFR_{PE}/MFR_{PB}$ | 2.5 | 0.5 |
| Conditions of extrusion lamination |  |  |
| Resin pressure (kg/m$^2$) | 44 | 38 |
| Resin temperature immediately below die (° C.) | 291 | 290 |
| Neck-in characteristics (mm) | 54 | 58 |
| Draw own characteristics (m/min.) | 260 | 300 |
| Fume/smoke emitted from the extruder | None | None |
| Heat seal strength (N/15 mm) |  |  |
| Heat seal temperature (° C.) |  |  |
| 130 | 3.4 | 2.8 |
| 140 | 3.7 | 3.1 |
| 150 | 4.2 | 3.6 |
| 160 | 5.3 | 3.7 |
| Phenomenon of resin threading from the peeled surfaces | None | Yes (Inferior) |

As can be seen from the conditions of extrusion lamination of Example 16 in Table 5, the resin composition used in Example 16 showed the smaller neck-in value, good draw-down characteristics, and there was not observed emission of fume/smoke from the extruder which in other instances may be caused by degradation of the resin composition the extrusion stage. Since a larger neck-in value represents an increased difference in the film thickness between a center portion and both edge portions and necessitates that much broader trimming area along each edge of the film in the film production step, a large neck-in value is by no means preferable from the practical point of view. Further, since the draw-down characteristic means an index of film productivity, it is difficult to form film at a high speed when the draw-down characteristic is small.

INDUSTRIAL APPLICABILITY

The sealant resin composition of the present invention gives good film forming properties, and the film formed therefrom has a practically sufficient heat seal strength, while an adequate balance is maintained between the heat sealability and the peelability. In light of the finding that the degree of dependence of the heat seal strength of the film on temperature in the heat sealing stage is low, the film is found to have excellent compatibility with the automatic packaging machine. Furthermore, when the heat sealed surfaces are forcibly peeled apart, there is hardly observed any thread-like resinous residue left on the peeled surfaces, and hence the film is suitable for the food packaging application. Moreover, the film hardly suffers blocking, and there is virtually no transfer of odor to the packed contents.

By virtue of the features, the sealant film formed from the resin composition and laminated films and containers, for which the sealant film is utilized, are adequate hermetic seal packaging materials having the easy peel feature, which all in all particularly suit the food packaging application.

What I claim is:

1. A sealant resin composition comprising 60 to 95 weight percent of an ethylene polymer having a melt flow rate of 0.2 to 30 g/10 min. and a density of 0.900 to 0.940 g/cm$^3$ and 5 to 40 weight percent of a 1-butene polymer having a melt flow rate of 0.1 to 25 g/10 min. and a 1-butene unit content of 60 to 100 mol. percent, wherein a ratio of the melt flow rate ($MFR_{PE}$) of the ethylene polymer to the melt flow rate ($MFR_{PB}$) of the 1-butene polymer, i.e., $MFR_{PE}/MFR_{PB}$, is not less than 1, wherein the composition has a melt flow rate of 0.2 to 30 g/10 min., and a film formed from the composition has a seal strength of 1 to 10 N/15 mm. when the film is heat-sealed at 150° C. and does not substantially produce any thread-like resinous residue when sealed surfaces are peeled apart.

2. A sealant resin composition according to claim 1, wherein the resin composition comprises an ethylene polymer having a melting point of a region of 100 to 125° C. as measured by a differential scanning calorimeter (DSC) and a 1-butene polymer having a melting point of a region of 70 to 130° C. as measured by the same method.

3. A sealant resin composition according to claim 1, wherein the resin composition has two or more melting peaks in a region of 70 to 130° C. as observed in a DSC measurement.

4. A sealant resin composition according to claim 3, wherein the resin composition has a melting peak having a largest peak area in a region of 100 to 125° C.

5. A sealant resin composition according to any one of claims 1 to 4, wherein the resin composition has a microstructure constituting an islands-in-the-sea structure.

6. A sealant resin composition comprising 60 to 95 weight percent of an ethylene polymer having a melt flow rate of 0.2 to 30 g/10 min. and a density of 0.900 to 0.940 g/cm$^3$ and 5 to 40 weight percent of a 1-butene polymer having a melt flow rate of 0.1 to 25 g/10 min. and a 1-butene unit content of 60 to 100 mol. percent, wherein a ratio of the melt flow rate ($MFR_{PE}$) of the ethylene polymer to the melt flow rate ($MFR_{PB}$) of the 1-butene polymer, i.e., $MFR_{PE}/MFR_{PB}$, is not less than 1.

7. A sealant resin composition according to claim 6, wherein the 1-butene polymer has a density of 0.880 to 0.925 g/cm$^3$.

8. A sealant resin composition according to claim 6 or 7, wherein the 1-butene polymer has a melt flow rate of 2 to 25 g/10 min.

9. A sealant resin composition according to claim 6 or 7, wherein the 1-butene polymer has a melt flow rate of 2.5 to 25 g/10 min.

10. A sealant resin composition according to claim 6, wherein the 1-butene polymer is a 1-butene homopolymer.

11. A sealant resin composition according to claim 6, wherein the 1-butene polymer is a copolymer of 1-butene and α-olefin having 2 to 20 carbon atoms except 1-butene.

12. A sealant resin composition according to claim 6, wherein the ethylene polymer is a high-pressure process low-density polyethylene.

13. A sealant resin composition according to claim 6, wherein the ethylene polymer is a linear ethylene-α-olefin copolymer of ethylene and α-olefin having 3 to 20 carbon atoms.

14. A sealant resin composition according to claim 6, wherein the ethylene polymer is a composition comprising a high-pressure process low-density polyethylene and a linear ethylene-α-olefin copolymer.

15. A sealant resin composition according to claim 14, wherein the ethylene polymer is a composition having a mixing ratio of the high-pressure process low-density polyethylene to the linear ethylene-α-olefin copolymer set at 0/100 to 75/25 (parts by weight).

16. A sealant resin composition according to claim 1, wherein the resin composition is a resin usable for extrusion lamination, cast molding or tubular film process.

17. A sealant film comprising the sealant resin composition according to claim 1 whose thickness is 3 to 100 μm.

18. A sealant film according to claim 17, wherein the film is formed by extrusion lamination, cast molding, or tubular film process.

* * * * *